United States Patent
Duri et al.

(10) Patent No.: US 7,401,352 B2
(45) Date of Patent: Jul. 15, 2008

(54) SECURE SYSTEM AND METHOD FOR ENFORCEMENT OF PRIVACY POLICY AND PROTECTION OF CONFIDENTIALITY

(75) Inventors: Sastry S. Duri, Yorktown Heights, NY (US); Marco O. Gruteser, Boulder, CO (US); Xuan Liu, Yorktown Heights, NY (US); Paul A. Moskowitz, Yorktown Heights, NY (US); Ronald Perez, Mount Kisco, NY (US); Edith G. Schonberg, New York, NY (US); Moninder Singh, Middletown, CT (US); Jung-Mu Tang, South Salem, NY (US); Charles P. Tresser, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 10/233,339

(22) Filed: Aug. 30, 2002

(65) Prior Publication Data

US 2004/0054918 A1 Mar. 18, 2004

(51) Int. Cl.
*G06F 21/00* (2006.01)
*H04L 9/00* (2006.01)
(52) U.S. Cl. .............................. 726/1; 705/64; 705/74
(58) Field of Classification Search .................. 705/43, 705/44, 64, 74; 726/1
See application file for complete search history.

(56) References Cited

U.S. PATENT DOCUMENTS

| | | |
|---|---|---|
| 5,164,988 A | 11/1992 | Matyas et al. |
| 5,502,766 A | 3/1996 | Boebert et al. |
| 5,881,155 A | 3/1999 | Rigal |
| 5,933,498 A | 8/1999 | Schneck et al. |
| 5,933,503 A | 8/1999 | Schell et al. |

(Continued)

FOREIGN PATENT DOCUMENTS

WO   WO 0141007 A2   6/2001

OTHER PUBLICATIONS

"Browser cookies which help web servers alert users of potential security violations," IBM Research Disclosure #448160, Aug. 2001, author unknown.

(Continued)

*Primary Examiner*—Gilberto Barron, Jr.
*Assistant Examiner*—Kristin D Sandoval
(74) *Attorney, Agent, or Firm*—Douglas Lashmit; Hoffman Warnick LLC (57) ABSTRACT

The invention includes various systems, architectures, frameworks and methodologies that can securely enforce a privacy policy. A method is include for securely guaranteeing a privacy policy between two enterprises, comprising: creating a message at a first enterprise, wherein the message includes a request for data concerning a third party and a privacy policy of the first enterprise; signing and certifying the message that the first enterprise has a tamper-proof system with a privacy rules engine and that the privacy policy of the first entity will be enforced by the privacy rules engine of the first enterprise; sending the message to a second enterprise; and running a privacy rules engine at the second enterprise to compare the privacy policy of the first enterprise with a set of privacy rules for the third party.

9 Claims, 5 Drawing Sheets

U.S. PATENT DOCUMENTS

| | | | |
|---|---|---|---|
| 5,987,440 | A | 11/1999 | O'Neil et al. |
| 5,999,908 | A | 12/1999 | Abelow |
| 6,158,007 | A | 12/2000 | Moreh et al. |
| 6,237,786 | B1 | 5/2001 | Ginter et al. |
| 6,253,193 | B1 | 6/2001 | Ginter et al. |
| 6,260,019 | B1 | 7/2001 | Courts |
| 6,292,899 | B1 | 9/2001 | McBride |
| 6,304,973 | B1 | 10/2001 | Williams |
| 6,314,409 | B2 | 11/2001 | Schneck et al. |
| 6,351,812 | B1 | 2/2002 | Datar et al. |
| 6,389,402 | B1 | 5/2002 | Ginter et al. |
| 6,904,417 | B2 * | 6/2005 | Clayton et al. ............... 705/59 |
| 2002/0029201 | A1 * | 3/2002 | Barzilai et al. ............... 705/80 |
| 2003/0088520 | A1 * | 5/2003 | Bohrer et al. ............... 705/74 |

OTHER PUBLICATIONS

Hind, J.R. et al., "Enforcing data policy using style sheet processing," IBM pending patent application, Aug. 1999.

Barzilai, Z. et al., "Business privacy in the electronic marketplace," IBM pending patent applications, Sep. 2000.

Lisada L. et al., "Vault controller based registration application serving web based registration authorities and end users for conducting electronic commerce in a secure end-to-end distributed information system," IBM pending patent application, Dec. 1998.

"Privacy informant—CYM standards," IBM Research Disclosure #438067, Oct. 2000, author unknown.

Strauss, J., Rogerson, K., "Policies for Online Privacy in the United States and the European Union," http://jsis.artsci.washington.edu/progra.../Nectconference/Strauss-RogersonPaper, date unknown.

Herzberg, A. et al., "System for automated trust and role assignment based on a web of public key attribute certificates," IBM pending patent application, Apr. 1999.

* cited by examiner

SECURE SYSTEM AND METHOD FOR ENFORCEMENT OF PRIVACY POLICY AND PROTECTION OF CONFIDENTIALITY

BACKGROUND OF THE INVENTION

1. Technical Field

The present invention relates generally to network-based data privacy policies, and more particularly to a system and method of implementing a secure privacy policy.

2. Related Art

As the amount of information transmitted over networks by businesses, individuals and other entities continues to grow, the ability to guarantee privacy of information has become an ongoing challenge. For example, users that subscribe to a provider's services are often required to disclose sensitive personal information such as credit card information, medical information, family information, etc. The only safeguard available to such users is the privacy policy of the provider. Unfortunately, it is often impractical for an end-user to manually check the privacy policies of each provider that they may encounter, particularly in a network environment such as the Internet where policies can change over time and the actual provider of some service (e.g., credit approval) may be transparent to the end-user.

To address this, automated privacy policy matching systems have been proposed that compare the privacy requirements of a user with the privacy policy of each provider to ensure that the privacy rights of the user are maintained. In such systems, data is only released if the privacy constraints of the user can be met. Thus, an end-user can be confident that any entity collecting their personal data will not use the data in manner that is proscribed by the end-user. Such a system is described in U.S. patent application Ser. No. 10/046,034, filed on Nov. 7, 2001, entitled "System, Method, and Business Methods for Enforcing Privacy Preferences on Personal-Data Exchanges Across a Network," which is hereby incorporated by reference.

Unfortunately, the efficacy of such privacy policy matching systems is completely dependent on the integrity of the people and organizations that provide the services, or otherwise have access to the data. For instance, even though a provider may guarantee data will not be used or sold without the consent of the end-user, there is nothing to prevent an employee of the service provider from stealing personal information. Accordingly, present matching systems may not always provide the necessary level of security to guarantee privacy.

Additional issues arise in a business-to-business (B2B) or enterprise-to-enterprise (E2E) environment where personal data of an end user is transmitted between two or more businesses or entities during a transaction in which the end-user is not a direct party. For example, during a a credit card purchase, a merchant must transmit sensitive information (e.g., credit card information) to a financial institution for approval. In a second example involving automotive telematics, an automobile may be required to transmit data to a service provider relating to the location of the vehicle, miles driven, etc. In these cases, like those mentioned above, the mere fact that the involved entities have a privacy policy matching system does not guard against outright theft and/or tampering. Accordingly, a need exists for a privacy policy system that includes the necessary security to ensure data privacy.

SUMMARY OF THE INVENTION

The present invention addresses the above-mention problems, as well as others, by providing various systems, architectures, frameworks and methodologies that can enforce a privacy policy in a secure environment. In a first aspect, the invention provides a method for securely guaranteeing a privacy policy between two enterprises, comprising: creating a message at a first enterprise, wherein the message includes a request for data concerning a third party and a privacy policy of the first enterprise; signing and certifying the message that the first enterprise has a tamper-proof system with a privacy rules engine and that the privacy policy of the first entity will be enforced by the privacy rules engine of the first enterprise; sending the message to a second enterprise; and running a privacy rules engine at the second enterprise to compare the privacy policy of the first enterprise with a set of privacy rules for the third party.

In a second aspect, the invention provides an automotive telematics system having a privacy protection framework, comprising: a plurality of sensors for collecting sensor data from the automobile; and a data protection manager for managing the sensor data, wherein the data protection manager includes: a system for receiving data requests for sensor data from a plurality of applications; a system for authenticating an application anytime a data request is made from the application; a system for storing each data request in a data log; and a privacy engine that ensures that each application requesting data has a privacy policy that complies with a privacy policy of the privacy engine.

In a third aspect, the invention provides a method for securely guaranteeing a privacy policy for credit card transactions, comprising: building a plurality of data processing devices that can recognize each other using cryptography; programming a privacy policy into each of the data processing devices; certifying that each of the data processing devices are equipped with privacy policy enforcement means; distributing the data processing devices to a merchant and a financial institution; issuing a credit card to an end user from the financial institution, wherein the end user is assigned a privacy policy in the data processing device of the financial institution; making a credit card purchase from the merchant by the end-user; and requesting data from the financial institution's data processing device by the merchant's data processing device, wherein the type of data that can be provided to the merchant's data processing device regarding the end user is governed by the assigned privacy policy of the end user.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

1. Overview

As noted above, the present invention provides various mechanisms for securely guaranteeing a privacy policy between two enterprises. In general, a privacy policy dictates the type of information or data that can be transmitted from one enterprise to another enterprise regarding a third party. The present invention sets forth various secure embodiments that ensure compliance with the privacy policy. For the purposes of this invention, the term enterprise may comprise, e.g., any type of business, machine, application, device, vehicle, appliance, etc.

2. Generic Enterprise-to-Enterprise Model

Figure 1:
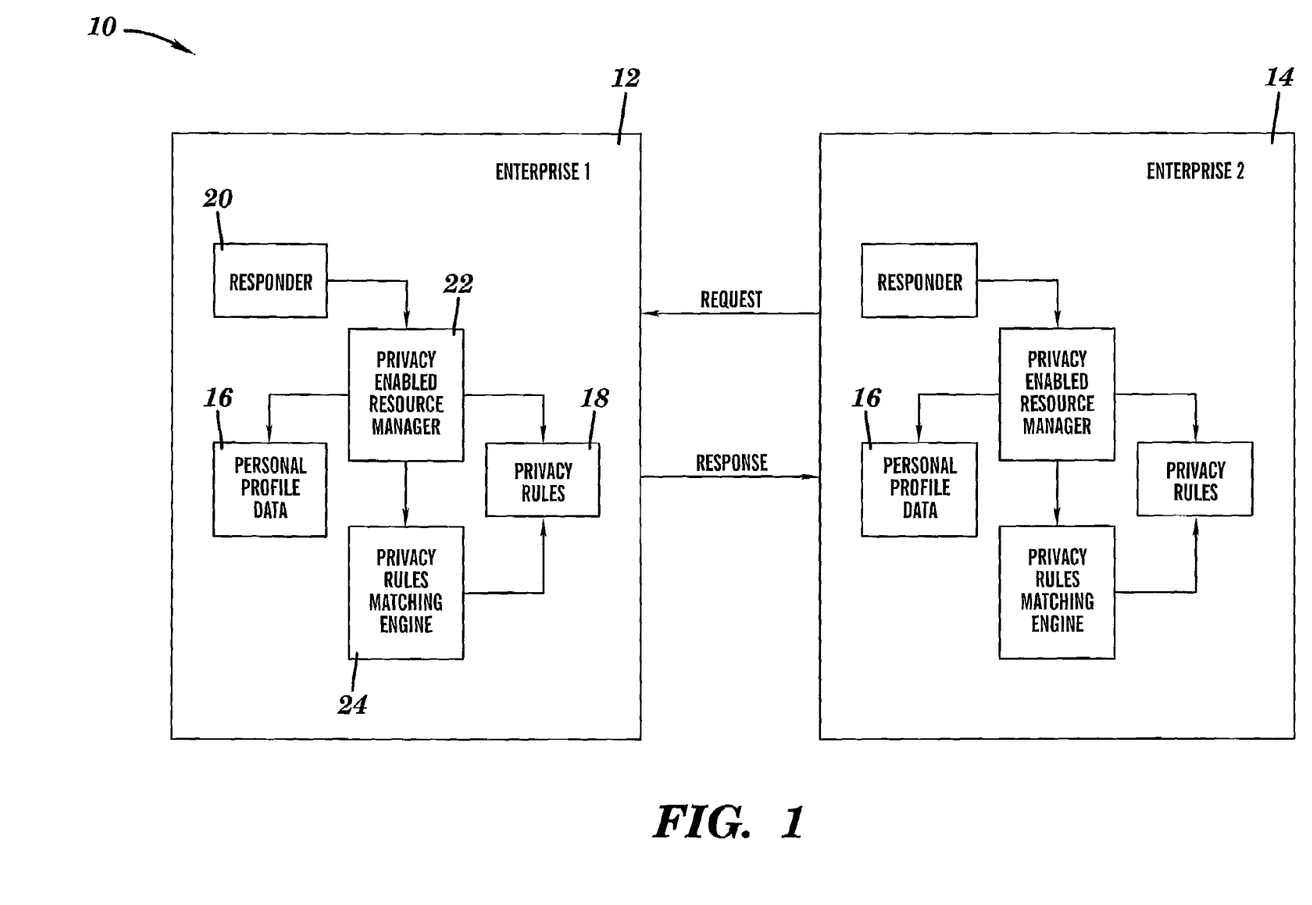
FIG. 1 depicts an enterprise-to-enterprise framework for implementing a secure privacy policy system.

Referring first to FIG. 1, a generic enterprise-to-enterprise architecture 10 in accordance with the present invention is shown. Each enterprise (i.e., Enterprise 1 and Enterprise 2) comprises various components for managing profile data 16 protected by privacy rules 18. Profile data 16 may comprise any type of data (e.g., financial, personal, health, etc.) that a third party might entrust to a respective enterprise, subject to a set of privacy rules, i.e., a privacy policy. In the case of an automotive system, the third party may be a driver or owner of a vehicle and the enterprise may be represented by a computing system with the vehicle or a computing system location at an application or telematics service provider.

In the described embodiment, the components are implemented in software and are stored on tamper-proof secure hardware, such as an IBM™ 4758 PCI Cryptographic Coprocessor (hereinafter "4758"). The components include: (1) a responder 20 that manages requests and responses for profile data 16; (2) a privacy-enabled resource manager 22 that intercepts all requests for profile data 16, and calls (3) a privacy rules matching engine 24 to verify that the requesting enterprise does not violate the privacy rules 18 associated with the profile data 16. Note that both the profile data 16 and the privacy rules 18 are both considered to be personal data, and protected by privacy rules 18. Privacy-enabled resource manager 22 maintains and manages the profile data 16 (i.e., it is responsible for updating, creating, and deleting data).

Interaction between each Enterprise 1 and Enterprise 2 is as follows. Enterprise 2 sends Enterprise 1 a message containing a request for data about a third party as well as Enterprise 2's privacy policy. The requested privacy policy may be specific to the third party or be a generic policy for Enterprise 2, in which case it might not need to be sent each time. The request is signed and certified, such that Enterprise 1 can be assured that Enterprise 2 has a tamper-proof, secure system, and that the privacy policy of Enterprise 2 will be enforced by the privacy rules engine in Enterprise 2.

Once Enterprise 1 receives the request, it is processed by the responder 20, which sends the request to the privacy-enabled resource manager 22. The privacy-enabled resource manager 22 calls the privacy rules matching engine 24, which matches the privacy policy and request from Enterprise 2 with the rules for the third party at Enterprise 1. If the match succeeds, then the privacy-enabled resource manager 22 retrieves the requested profile data, and returns it to the responder 20. The responder 20 encrypts and signs the response, which is returned to Enterprise 2.

As noted above, each request for information is signed by the requesting enterprise and certified. Certification assures the enterprise receiving the request that the requesting enterprise will guarantee the enforcement of privacy policies. The validity of such a certification can be readily determined by, for example, consulting a list of certified enterprises maintained by a trusted third party agency. Trusted third parties, or trusted intermediaries, are mutually trusted entities that are commonly used to certify or witness transactions between two or more potentially hostile parties in a transaction. Examples include companies such as VERISIGN™, a certificate authority and trust services provider, or nonprofit organizations such as TRUSTe™, which provide privacy policy disclosure and attestation services. Another example of trusted third parties is the Key Distribution Center (KDC) in the Kerberos authentication protocol, which is an entity that is trusted with the identification information of all parties on a network/system for the purposes of authenticating resource usage. As an alternative, a hardware manufacturer could build a series of machines that could provide the necessary certification. Such an embodiment is described next with reference to a credit card transaction system.

3. Credit Card Transaction

Figure 2:
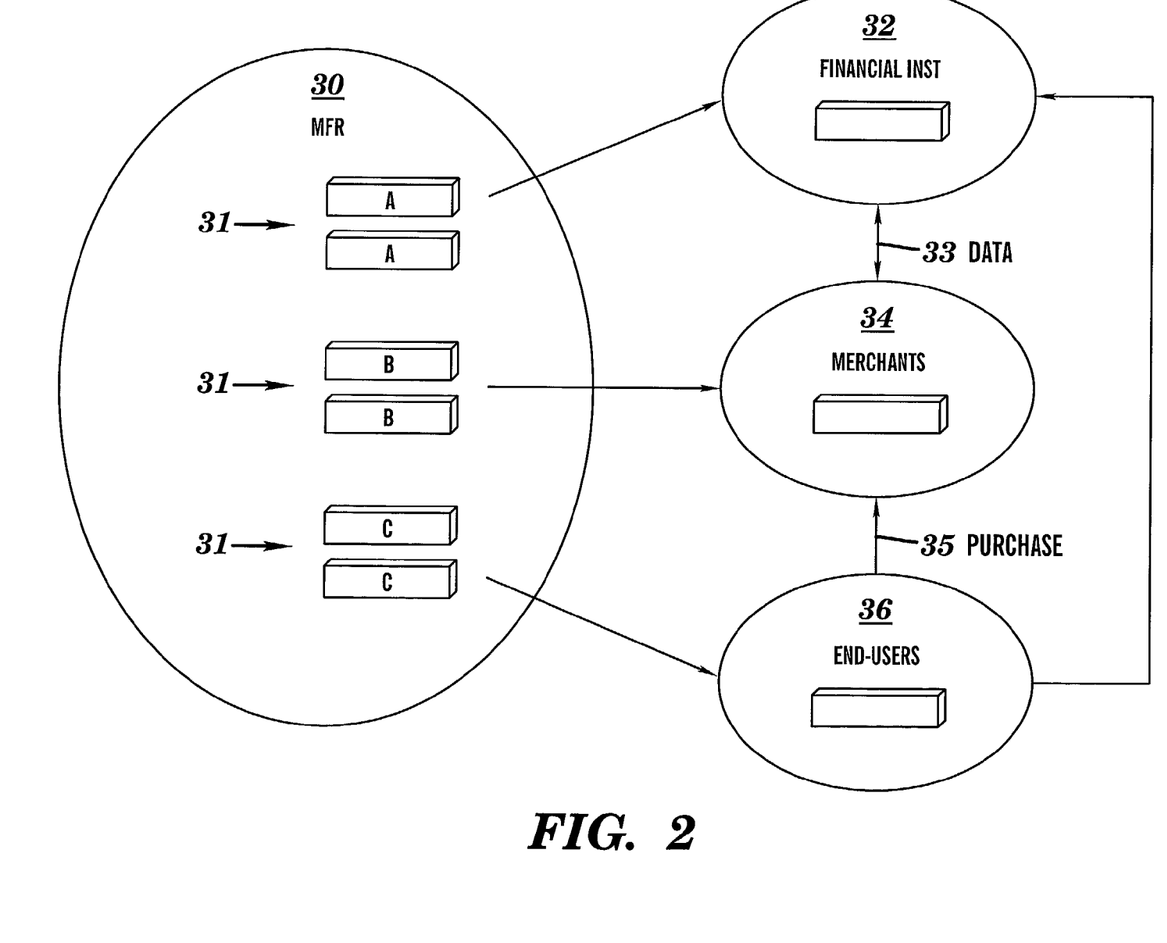
FIG. 2 depicts a method of implementing a secure privacy policy system in a credit card transaction environment.

As noted above, one of the challenges of providing a secure privacy policy framework involves certifying that an enterprise requesting data will implement and enforce its published privacy rules. Thus, for instance, in a credit card transaction environment as shown in FIG. 2, a financial institution 32 must release financial data 33 to a merchant 34 when an end-user 36 makes a credit card purchase 35. Even though merchant 34 may publish a privacy policy, without some security, there is no guarantee that merchant 34 will abide by the policy. The present embodiment addresses this by producing a series of "pre-configured" data processing devices (i.e., machines 31) that can recognize each other using any of a set of well-known cryptographic mechanisms. In this case, manufacturer 30 would build the whole series and certify all the machines are equipped to enforce privacy and confidentiality policies. Each machine would be built for a specific user, e.g., financial institutions, merchants, end-users, identity service providers, etc.). An "identity service provider" is a service that provides and/or certifies information about a person. It could provide, for example, basic authentication or other information about a person. For example, it may automatically fill in forms or certify facts, such as might be needed to complete a transaction, e.g., legal age, credit-worthiness, etc. When the policy is written or at the time that it is created, only the publicly known rule of the business, e.g., merchant, financial institutions, merchants, end-users, identity service providers, etc., and the decision of the customer would be permitted to rule, and the will of the customer would be respected with no possible interference, except possibly by government agencies with proper warrants.

The enforcement part would be accomplished, for instance, by using the teachings of above described Patent Application "SYSTEM, METHOD, AND BUSINESS METHODS FOR ENFORCING PRIVACY PREFERENCES ON PERSONAL-DATA EXCHANGES ACROSS A NETWORK, which would provide a secrecy barrier using cryptography with a 4758 or a similar machine.

To operate credit and charge card transactions, card data from end-user 36 would be encrypted and sent to the merchant's 4758, and from there to the financial institution 32 for validation and all aspects of execution. The merchant's 4758 would be securely configured by the manufacturer 30 to only allow access to, for example: (1) limited types of data or identifiers (set by the privacy policy) of the customer; (2) the financial institution's commitment to the merchant; (3) and the amount money involved. Other enterprises involved in such a transaction would have similar limitations pre-configured into their own machines 31.

The use of private key/public key pairs (i.e., public schemes) as means to encrypt or digitally sign a file or document using secret encoding keys or secure hash functions (such as SHA-1, as fully specified in the Federal Information Processing Standard Publication 180-1) are well known. A description of these techniques with directions on how to use several of their implementations can be found in "Handbook of applied Cryptography", by Alfred J. Menezes, Paul C. van Oorschot and Scott A. Vanstone, CRC Press, 1997. Another important enabler of secure electronic communication is to exchange secret keys while exchanging only messages that can be understood by third parties. Several protocols have been created to this effect, such as Diffie-Hellman. In the context of the present invention, this would be used, for instance, to create a series of machines that can recognize each other. The ability to "recognize" allows for the authentication of machines to each other based upon mutually respected cryptographic certification, and hence, their ability to trust each other based on those cryptographically authenticated identities.

The above-described environment would allow the end-user 36 to make secure credit or debit card payments over the World Wide Web. Namely, when the end-user 36 is dealing with enterprises that utilize the secure systems described above, the end-user 36 could receive some certification via their browser that the merchant they are dealing with only has access to the information agreed upon between the end-user 36 and the financial institution 32. In this case, the end-user could also be provided with a data processing system (e.g., software, such as a downloadable pluggin; or secure hardware) that would provide a secure interface. Using such a system, merchants and financial institution would be allowed to operate at moderate costs while providing certifiable privacy and security.

4. Automotive Telematics

A further embodiment where privacy policy security is desirable involves automotive telematics, where information from automotive vehicles is being collected for various purposes. Automotive telematics utilizes information-intensive applications that are being enabled for vehicles (automobiles, trucks, buses, etc.) by a combination of telecommunications and computing technology. The automobile is, in effect, a computing platform to which mobile commerce services may be delivered. The services being delivered today on a regular basis and projected for the near future include navigation information, emergency roadside assistance, location-based services, delivery of digital information such as e-mail, entertainment, diagnostics and prognostics, and pay-for-use rental and insurance. These applications are enabled by the collection and use of data which may include information on the location of a vehicle as a function of time, emergency situations including accidents and personal health emergencies, diagnostic data on the many systems within the vehicle, services and entertainment that are selected by the vehicle occupants, the demographics of the driver and passengers, and the behavior of the vehicle driver. Location information may be based upon GPS (Global Positioning Satellite) information and include longitude, latitude, altitude, and a time stamp.

In the automotive telematics environment, there is a significant potential for the misuse of collected data. End users or consumers may substitute false data or hack into in-vehicle applications in order to avoid costs associated with provided services. Telematics service providers and application providers may sell consumers' data to third parties without the permission of the consumers. Accordingly, the present embodiment provides various safeguards to help guarantee the security data subject to one or more privacy policies.

Figure 3:
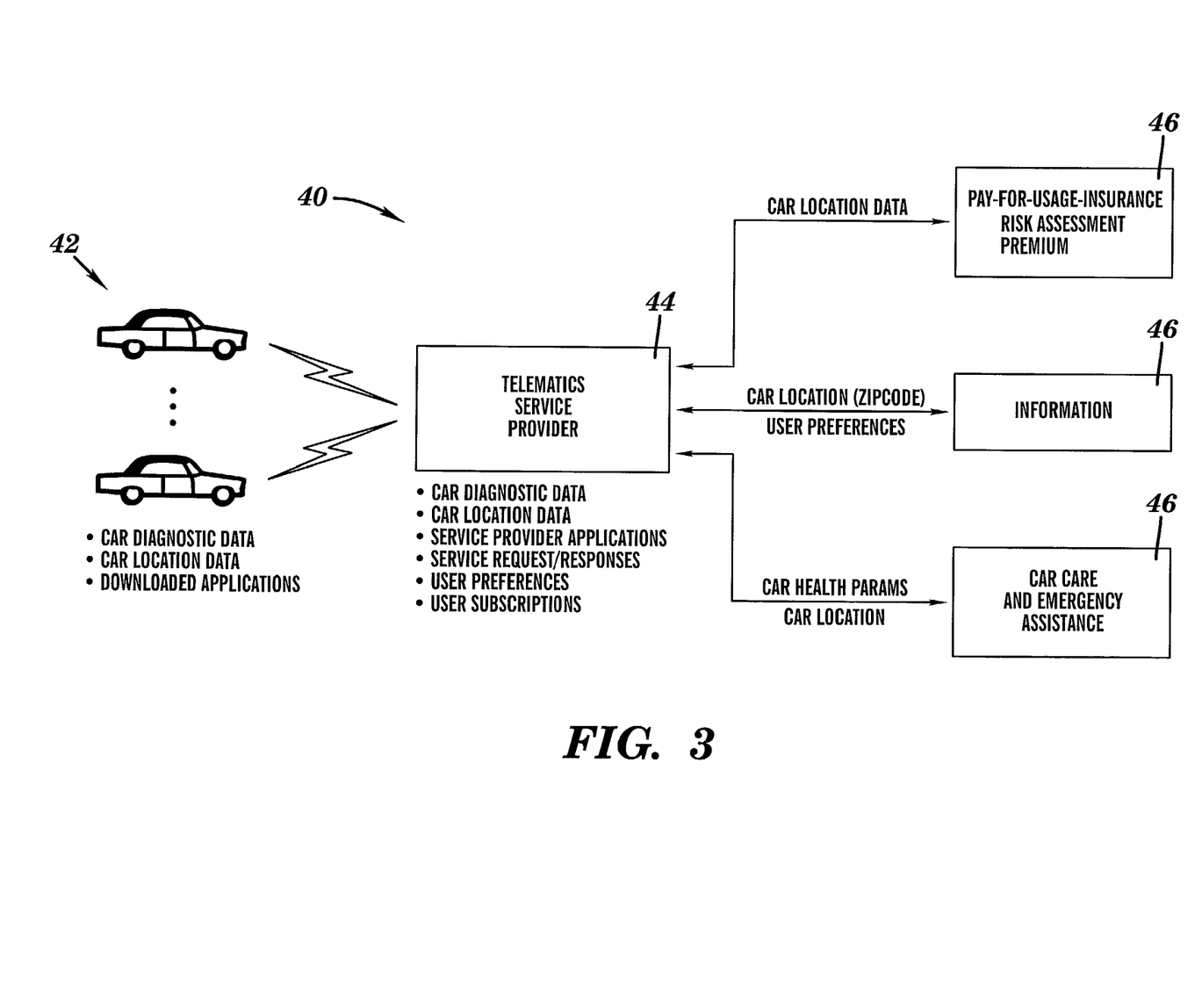
FIG. 3 depicts an overview of an automotive telematics system.

FIG. 3 depicts an overview of a typical automotive telematics application 40. Cars 42 are equipped with a wireless communication device, a variety of sensors, and a car computer that has a display, sufficient memory, storage, and processing to run complex embedded applications and middleware. The car computer interfaces to a car bus and other car sensors, for example, a Global Positioning System (GPS) sensor, and collects car engine performance data, safety information, and car location.

Car users subscribe to a telematics service provider (TSP) 44 to get a variety of services from application service providers (ASP's) 46, which may include Pay-for-Use Insurance, Information, and Car Care and Emergency Assistance. In order to get services from an ASP, a car user needs to send some or all the information collected by the car computer to the ASP. In the framework of FIG. 3, each car transmits data as necessary to the TSP 44, which then provides data to different ASPs as needed. In this case, the TSP acts as a service aggregator and a data broker. Data that is aggregated may be derived from many sensors located in one vehicle or from many vehicles. In addition to the data transmitted by cars, the TSP can store user preferences and user subscriptions to services. Thus the TSP may subscribe to data, e.g. the data is transmitted by the car at intervals, or the data transmission may be event based, e.g. sent to the TSP when assistance is required.

As shown, different ASP's often need different user data and use it for different purposes. The Pay-for-Use Insurance ASP may need user identification data, GPS data, miles driven to compute premiums and perform risk analysis. The Information ASP may need user location, and user preferences to send back information on local attractions. The Car Care and Emergency Assistance ASP may need car engine performance and safety information on regular basis, and car location in case of emergency. As is evident, not all ASP's need the same information. For instance, data identifying the user is not required for the Information ASP, but is required for the Pay-for-Use Insurance ASP.

Dynamically generated data within an automobile creates unique security challenges. The sheer amount of the data generated makes it difficult, if not impossible, to store it within the automobile itself. Accordingly, certain pieces of data must be stored outside of the automobile (e.g., by a trusted third party on behalf of the individual) thereby emphasizing the importance of the driver's privacy policies. Moreover, unlike static data which has to be collected only once by any interested party, dynamic data has to be collected repeatedly by a service provider to keep it up-to-date. Thus, a continuous transfer of dynamic data to more than one service provider, governed by differing privacy policies is often required. Accordingly, a data protection framework is needed to ensure that each ASP is indeed enforcing its privacy policy. The data protection framework of the present embodiment is built on the foundation of privacy and security technologies. The privacy technology enables users and service providers to define an underlying data model, and to define policies authorizing access to data. The security technology provides traditional capabilities such as encryption, authentication, and non-repudiation. Non-repudiation is the property of a cryptosystem whereby parties are unable to deny actions they perform, e.g., not being able to deny after the fact that you authorized a purchase/transaction. In addition, the security technology provides secure environments for protected execution, which is essential to limiting data access to specific purposes.

User-defined policies specifying personal data handling preferences, and solution provider policies attesting to user data handling practices together form virtual contracts between users and ASP's. The present framework enables enforcement of these policies by categorizing sensor data and defining data handling rules according to classifications and policies, and by assuring ASP compliance to the rules. Enforcement of policies and compliance assurance extends from the in-vehicle client to the solution or service provider back-end systems, and can be extended to third-party interactions within the domain of the framework.

Security and privacy policy enforcement relies on the classification and protection of data upon its creation, storage, transmission, usage, and destruction, ensuring integrity of the data for both users and ASP's. Data protection is achieved in part by employing cryptographic algorithms and protocols, both for confidentiality as well as for integrity, authentication and authorization. Data classification and protection also extends to solution or application integrity. Applications must first be authenticated; then executed in compliance with applicable policies and rules that are validated and auditable; and the framework will enable the secure configuration and update of applications as well as of the framework components themselves.

Figure 4:
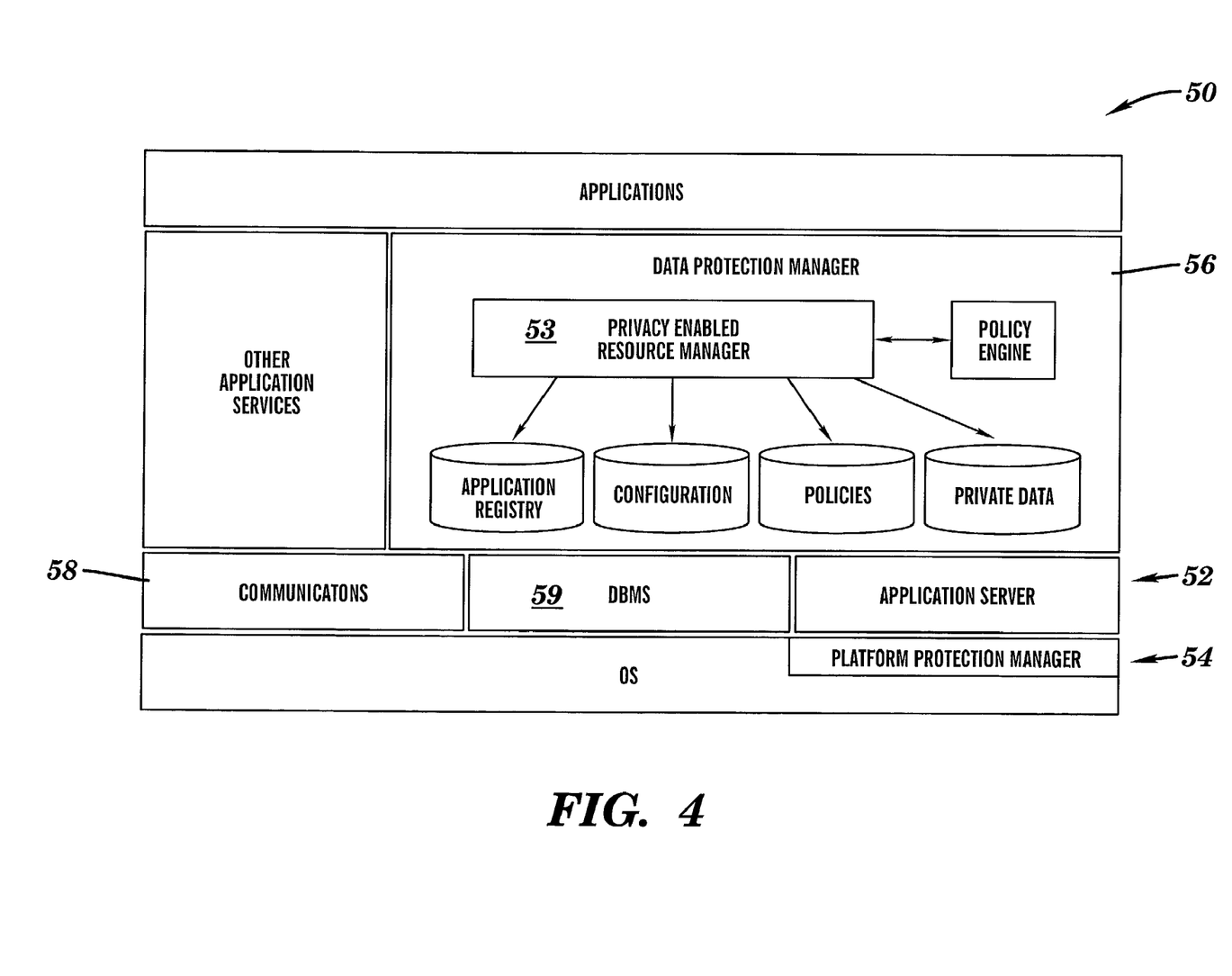
FIG. 4 depicts an architecture for enforcing a privacy policy.

Referring to FIG. 4, a data protection platform architecture 50 is shown. Architecture 50 can be instantiated in car, in TSP and in ASP settings by choosing appropriate implementations of the two bottom layers 52, 54. In a car environment, an RTOS (real-time operating system) such as Neutrino™ by QNX™ may be utilized, whereas the TSP and ASP may use server operating systems such as LINUX™. The application server for in-car environments may use an OSGi (Open Services Gateway Initiative) based platform, while remote application servers may use WebSphere™ by the IBM Corporation, for example. The Platform Protection Manager, which is a part of the operating system, OS, monitors the integrity of all system software including the Data Protection Manager 56 and provides security functions such as verifying signatures on applications. The Communications layer 58 handles encrypted, authenticated, and monitored network connections. For example, it supports protocols like SSL (Secure Sockets Layer) or IPSec (IP (Internet Protocol) Security Protocol). The DBMS (database management services) layer 59 provides basic storage capabilities for the Data Protection Manager 56. The Data Protection Manager 56 is the key privacy technology, which regulates application access to data and enforces all other aspects of the privacy policy such as retention constraints.

Figure 5:
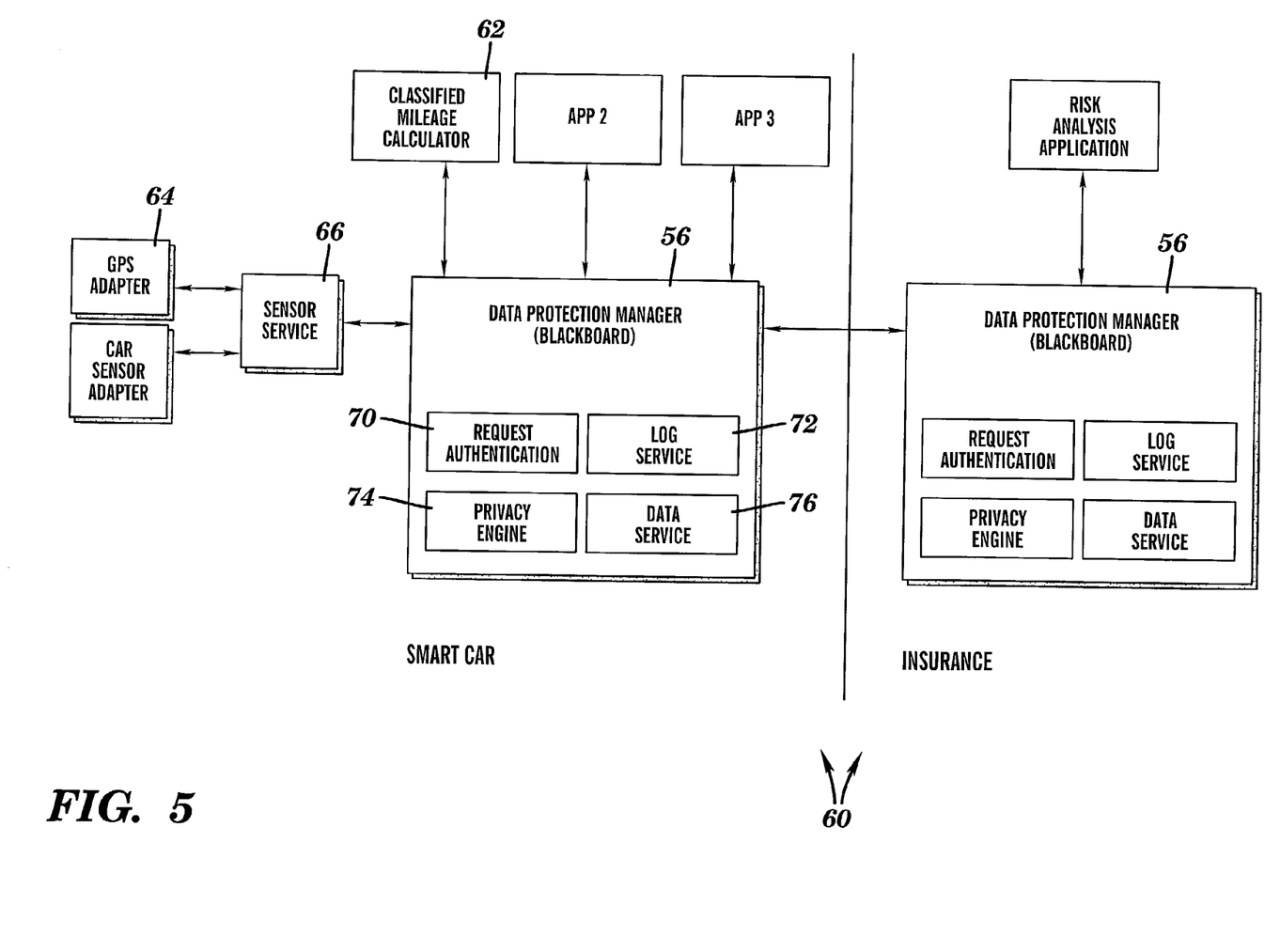
FIG. 5 depicts an architecture for enforcing a privacy policy in an automotive telematics environment.

Communication between data sensors and applications may utilize the architectural framework 60 shown in FIG. 5. In this embodiment, a virtual blackboard provides a data processing environment that exists both locally (i.e., on the automobile) and remotely (e.g., at an ASP). Data Protection Manager 56 provides an interface for information producers such as sensors or aggregation applications to publish data on the blackboard. Information consumers access this data through periodic queries or through a subscription/notification mechanism. Because the blackboard paradigm is extended across a virtual network, applications at the TSP or ASP can submit queries to, or receive notifications from, the in-car blackboard mechanism.

The embodiment of FIG. 5 illustrates how applications are implemented. In this case, a GPS sensor may periodically publish location data items in the Data Protection Manager 56 via a GPS adapter 64 and senor service 66. An application, such as the Classified Mileage Calculator 62 can subscribe to the GPS data and compute (with the help of a road map) the total mileage driven on different types of roads. The results are again published in the Data Protection Manager 56. A Risk Analysis application running on the insurance server remotely can also subscribe to the aggregated and classified mileage data.

Blackboard-based architectures provide a simple paradigm for implementing sensor-based applications. In addition, because every data access passes through the central Data Protection Manager 56, the blackboard approach provides another key advantage for a privacy protection framework that requires verifying that data accesses comply with the appropriate privacy policies. To this end, Request Authentication 70 first authenticates a requester, then the request is stored in Log Service 72, and finally the Privacy Engine 74 examines the request. Only if the request complies with the policy, data is returned to the requestor by Data Service 76.

The Data Protection Manager 56 provides the core functionality needed for data protection. As can be seen in FIG. 4, it controls access to private data, user policies, configuration data, and an application registry. All applications needing access to private data must be signed and must register with the Data Protection Manager 56. The application server 52 entrusts its configuration data to the Data Protection Manager 56 and is by default registered with it. In this sense, application server configuration data is a special type of private data.

The Privacy Enabled Resource Manager (PERM) component 53 handles administration of data models, policies, and application registration. In addition, PERM handles requests for private data. A typical request for data includes application credentials, privacy policy data, and description of data items. The PERM first verifies application credentials. Upon successful verification of credentials, the PERM compares an application privacy policy with the user's privacy policy to determine whether to grant access or not. In addition to supporting request/response protocol, PERM also supports the subscription model for data.

Since protection of information—user data, vehicle data, time and location information, and even executable software that is generated or stored in, or transmitted to/from, the in-vehicle client platform is key to the success of automotive telematics, our security focus of the present embodiment seeks to ensure the integrity of such data during its life cycle. Security is provided from a bottoms-up perspective starting with the physical client platform itself. The view extends to the secure configuration and update firmware/software—the software that is first to execute and assures the secure instantiation of subsequent software components, including the system software (e.g., embedded operating system), middleware, and application support. Each layer of hardware and software provides its own security-related features. This concept of having multiple layers of protection with the goal of preventing a single point of compromise is called defense-in-depth. Together, the physical client platform and the various software layers comprise a secure execution environment.

The security features offered by the in-vehicle client platform, as well as the telematics services and solutions providers' platforms, will in large part determine the degree to which data privacy and protection assurances can be given. While the software components of the end-to-end framework may and should be vetted for security and for compliance to a privacy protection design, hardware components of the framework may still be vulnerable to attack or misuse both from within (e.g., users, service providers) as well as from external parties (e.g., hackers, thieves, competitors).

Ideally, physically and logically secure systems are to be used for the in-vehicle clients as well as services and solutions providers' servers—i.e., systems that would resist most physical and logical attacks (e.g., physical penetration, voltage or temperature attacks, power analysis, monitoring of electromagnetic emissions), and sensing and responding to all others before a system compromise (e.g., by rendering sensitive data inaccessible). Secure coprocessors can provide physically and logically secure subsystems that operate in conjunction with a local host system, employing cryptographic acceleration hardware, and providing a secure execution environment for the programs that are supposed to be run. Such secure coprocessors the IBM 4758 PCI Cryptographic Coprocessor, a product used extensively in servers for applications requiring the highest levels of assurance (e.g., banking and financial applications, electronic commerce systems). Furthermore, the near term future promises similar devices for mobile and client platforms, at prices commensurate with such client devices, and offering performance capabilities surpassing the current generation of server-oriented secure coprocessors. Pervasive low-end secure coprocessors (e.g., smart cards, secure tokens), used for key storage and user authentication, are also currently available and may provide some security assurances in lieu of more comprehensive devices.

Secure coprocessors are also well suited to an emerging industry such as automotive telematics in that they generally support industry standard interconnects and communication protocols, allowing for greater ease in porting or integrating with existing telematics platforms. With or without physically secure platforms for clients and servers, both platforms should allow for secure configuration, update, and execution (booting) of system and application software. Typically, this functionality must exist primarily in the firmware/software that is initially executed upon power-on (e.g., BIOS or system boot firmware). This power-on software layer is often in read-only memory, it should have minimal complexity and size, and should be able to (cryptographically) authenticate/ verify a minimal set of commands and data that enable the configuration and update of the subsequent software layer (e.g., the system software or operating system layer). Once the platform system software has been securely configured/ updated, the power-on software layer can authenticate the system software before each execution/instantiation, i.e., perform a secure boot.

The operating system, like the power-on software and physical platform before, must also provide certain security features, such as access control, in order to support overall system and data protection. There is a great deal of ongoing work in the area of secure operating systems. Elements of the application and application support layer may be highly integrated with the operating system. Together, these layers can provide support for cryptographic programming libraries, secure communication protocols, encrypted file systems or databases, firewall and intrusion detection capabilities, and even virtual machine application authentication, and execution.

Further, because application isolation is important when applications potentially come from competing or otherwise mutually hostile parties, the application support layer itself can provide virtual environments/machines for the purpose of protecting these applications from interfering with each other or the operating system.

The application support layer first verifies that the application has proper credentials. Then it deploys the application in a sandbox to protect it and other applications. Each sandbox is associated with a set of access privileges defining access to system resources such as files and sockets. In addition, each sandbox is associated with a name space. By properly structuring execution environment name spaces it is possible to define which applications and which system resources are available to a given application and therefore control the degree of isolation. Another aspect of isolation deals with application communication. The application support layer prevents direct communication between different applications and with outside entities. All local and network communication are processed through the Data Protection Manager which checks the privacy policies before allowing communication to proceed and generates an audit trail for later verification. Requests for data by one application from another application are also similarly checked for privacy policy compliance. Requests for data and exchanges of data are logged by the Log Service of the Data Protection Manager. These logs may be audited later to confirm that privacy policies have been complied with.

As alluded to above, the same hardware and software layers, and their respective security features, described for the in-vehicle client platform are also required for the various telematics service provider servers. End-to-end and life cycle protection of relevant data is assured only when the same level of security is employed across the entire system.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A method for securely guaranteeing a privacy policy between two enterprises, comprising:
   creating a message at a first enterprise, wherein the message includes a request for data concerning a specifically identified third party for data stored by a second enterprise and a privacy policy of the first enterprise;

signing and certifying the message that the first enterprise has a tamper-proof system with a privacy rules engine and that the privacy policy of the first enterprise will be enforced by the privacy rules engine of the first enterprise;

sending the message to the second enterprise; and running a privacy rules engine at the second enterprise to compare the privacy policy of the first enterprise with a set of privacy rules for the third party, wherein in response to a match between the privacy policy of the first enterprise and the set of privacy rules for the third party: encrypting the data requested by the first enterprise; and sending the encrypted requested data from the second enterprise to the first enterprise.

2. The method of claim 1, wherein:

the certifying step includes the preliminary act of registering the first enterprise with a trusted agency; and the second enterprise checks the trusted agency to verify the certification.

3. The method of claim 1, wherein both the first and second enterprises include a secure co-processor.

4. The method of claim 1, wherein both the first and second enterprises each includes a hardware device built with a cryptographic identifier that allows the hardware device of the first enterprise and the hardware device of the second enterprise to recognize and certify each other.

5. The method of claim 1, wherein the first enterprise comprises a merchant system, the second enterprise comprises a financial institution system, and the data comprises credit card information regarding an individual.

6. The method of claim 1, wherein the first enterprise comprises a service provider, the second enterprise comprises a vehicle, and the data comprises information derived from the vehicle.

7. The method of claim 6 wherein the information comprises identification information and one of location and diagnostic information.

8. A method for securely guaranteeing a privacy policy between two enterprises, comprising:

creating a message at a first enterprise, wherein the message includes a request for data concerning a specifically identified third party for data stored by a second enterprise and a privacy policy of the first enterprise;

signing and certifying the message that the first enterprise has a tamper-proof system with a privacy rules engine and that the privacy policy of the first enterprise will be enforced by the privacy rules engine of the first enterprise, wherein: the certifying step includes the preliminary act of registering the first enterprise with a trusted agency; and the second enterprise checks the trusted agency to verify the certification;

sending the message to the second enterprise; and running a privacy rules engine at the second enterprise to compare the privacy policy of the first enterprise with a set of privacy rules for the third party.

9. A method for securely guaranteeing a privacy policy between two enterprises, comprising:

creating a message at a first enterprise, wherein the message includes a request for data concerning a specifically identified third party for data stored by a second enterprise and a privacy policy of the first enterprise;

signing and certifying the message that the first enterprise has a tamper-proof system with a privacy rules engine and that the privacy policy of the first enterprise will be enforced by the privacy rules engine of the first enterprise;

sending the message to the second enterprise; and running a privacy rules engine at the second enterprise to compare the privacy policy of the first enterprise with a set of privacy rules for the third party. wherein both the first and second enterprises each includes a hardware device built with a cryptographic identifier that allows the hardware device of the first enterprise and the hardware device of the second enterprise to recognize and certify each other.

* * * * *